United States Patent [19]
Grynkiewicz

[11] Patent Number: 5,150,840
[45] Date of Patent: Sep. 29, 1992

[54] LAWN CHEMICAL DISPENSER

[76] Inventor: John M. Grynkiewicz, 68 Fox Hill Ln., Enfield, Conn. 06082

[21] Appl. No.: 772,923

[22] Filed: Oct. 8, 1991

[51] Int. Cl.⁵ .............................................. B05B 7/26
[52] U.S. Cl. .................................... 239/305; 239/310
[58] Field of Search ............................... 239/303–305, 239/307, 310

[56] References Cited

U.S. PATENT DOCUMENTS

| | | | |
|---|---|---|---|
| 1,079,721 | 11/1913 | Pungs | 239/310 |
| 2,228,922 | 1/1941 | Gorlick | 239/310 |
| 2,573,687 | 11/1951 | Brock | 239/310 |
| 2,602,699 | 7/1952 | Otto et al. | 239/310 |
| 3,260,464 | 7/1966 | Harant | 239/310 |
| 4,333,493 | 6/1982 | Beiswenger et al. | 239/310 |
| 4,340,179 | 7/1982 | Knapp | 239/310 |
| 4,385,034 | 5/1983 | Gacer | 239/310 |

FOREIGN PATENT DOCUMENTS 2545685 11/1984 France .................. 239/310

Primary Examiner—Andres Kashnikow
Assistant Examiner—Karen B. Merritt
Attorney, Agent, or Firm—McCormick, Paulding & Huber

[57] ABSTRACT

A dispenser for use in series with a conventional garden hose and lawn sprinkler system has at least three passageways controlled by at least one three way valve to provide tap water to an interior chamber or to a through passageway for bypassing the chamber. Liquid chemicals are dispensed from the same chamber that also serves to hold pellets or the like. Siphoning of the liquid chemical, or dissolving of dry pellets can be accomplished simply by selecting one of three possible valve positions. The third valve position provides a non-dispensing through passageway for directing water straight through to the lawn sprinkler.

6 Claims, 3 Drawing Sheets

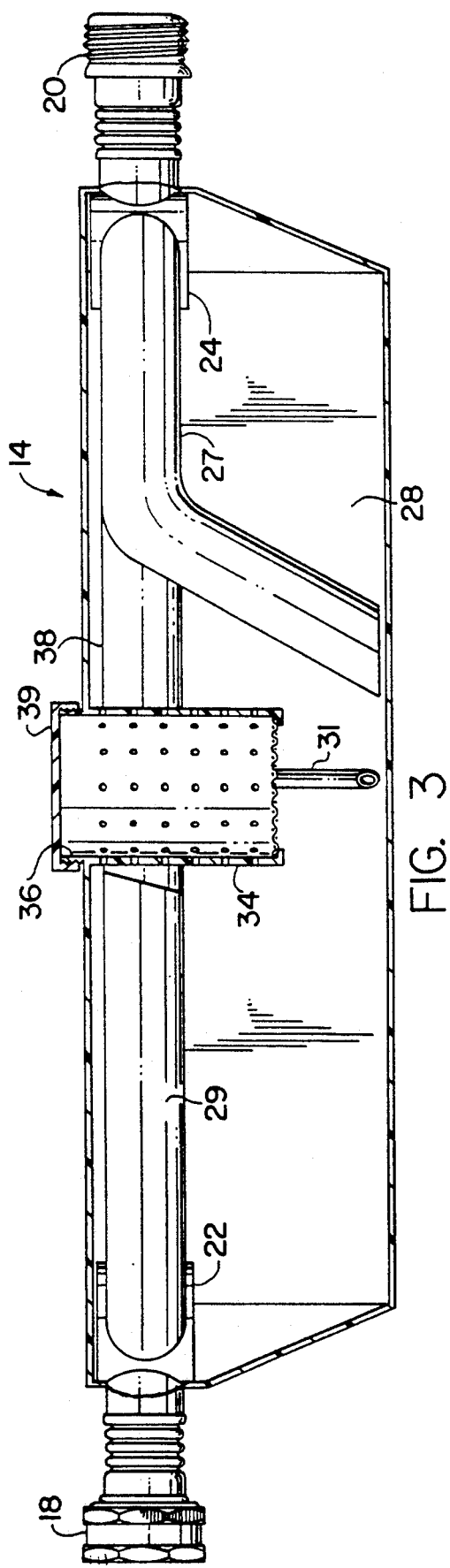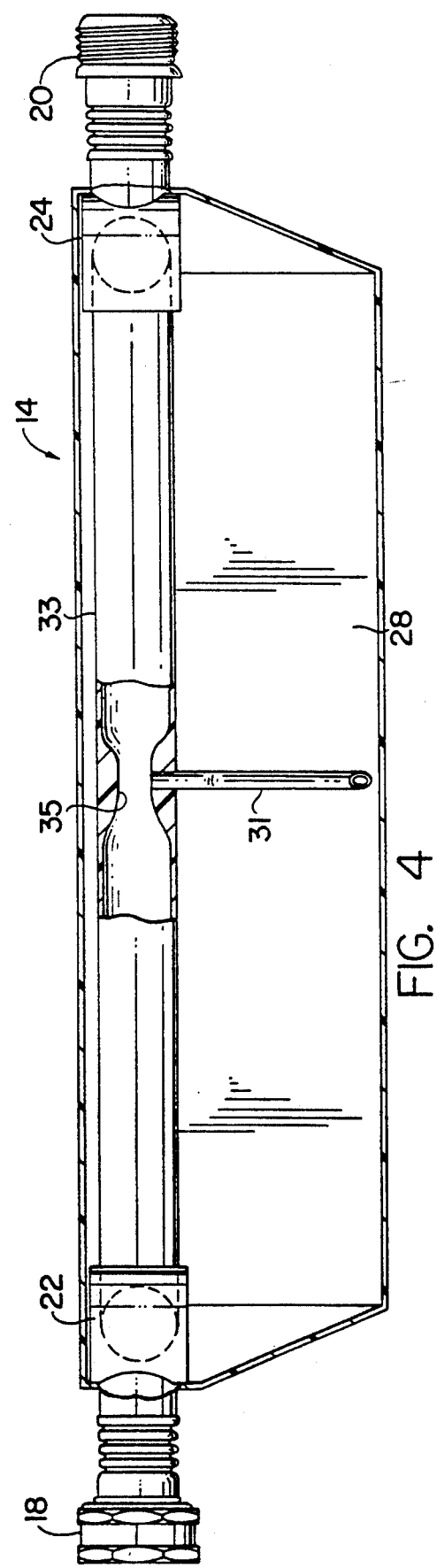

LAWN CHEMICAL DISPENSER

This invention relates generally to chemical dispenser for use with a garden hose and sprinkler system of the type generally used by the homeowner in watering his lawn.

The general purpose of the present invention is to provide a dispenser for use with a conventional garden hose and sprinkler system which dispenser will permit the sprinkler to be used to dispense chemicals or the like whether these chemicals be in the form of tablets or in a liquid form. The device also will permit the conventional garden hose and sprinkler system to be used in a conventional fashion without disconnecting the dispenser from the system.

SUMMARY OF THE INVENTION

In accordance with the present invention a lawn chemical dispenser is provided for use with a garden hose and sprinkler system and comprises a housing having hose fittings at opposed end portions thereof. These fitting are adapted to receive conventional garden hose fittings or the like. A three way valve is provided at the inlet end and a two way valve at the outlet end. One end portion of the housing defines three passageways, each passageway communicating with one of the three valve ports associated with the three valve positions.

Two of these three passageways communicates with a chamber defined by the housing and this chamber has an access port for receiving a liquid chemical or a dry chemical to be applied to the lawn. Finally, a third passageway extends in uninterrupted fashion from said three way valve in one end portion of the housing to a two way valve in the opposite end portion of the housing.

The device is designed to be fabricated quite readily from a thermoplastic material as for example by injection molding or other inexpensive procedure. A removable closure is provided for the access port and includes a vent opening to facilitate operation of the dispenser in its capacity as a dispenser of either solid or liquid chemicals.

BRIEF DESCRIPTION OF THE DRAWINGS

FIG. 3 is a sectional view taken generally on the line 3—3 of FIG. 2.

FIG. 4 is a sectional view taken generally on the line 4—4 of FIG. 2.

DETAILED DESCRIPTION

Figure 1:
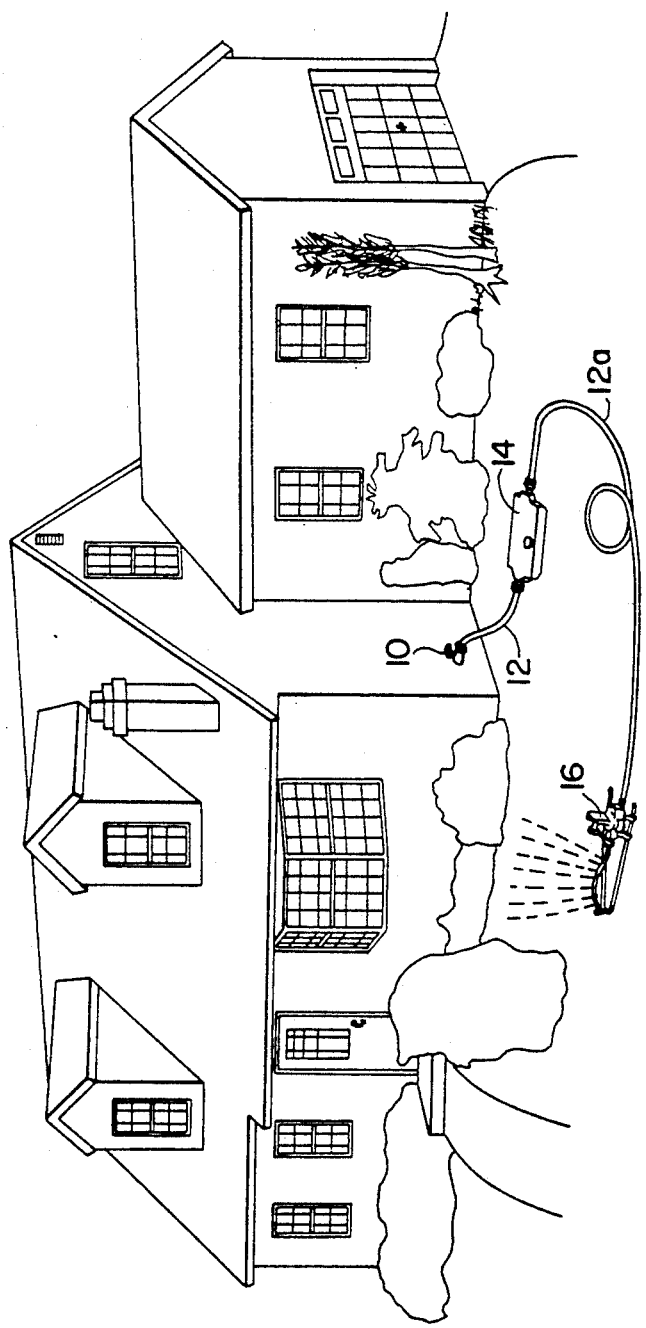
FIG. 1 is a general view of a typical lawn sprinkler system associated with a residential home and illustrates the dispenser of the present invention provided intermediate the water faucet on the house and the sprinkler.

Turning now to the drawings in greater detail, FIG. 1 shows a conventional exterior household water faucet 10 to which a garden hose 12 is connected at one end, the other end of the garden hose being connected to a dispenser 14 of the present invention. A second length of hose 12a is provided for connecting the output of the dispenser 14 to a conventional sprinkler 16.

Figure 2:
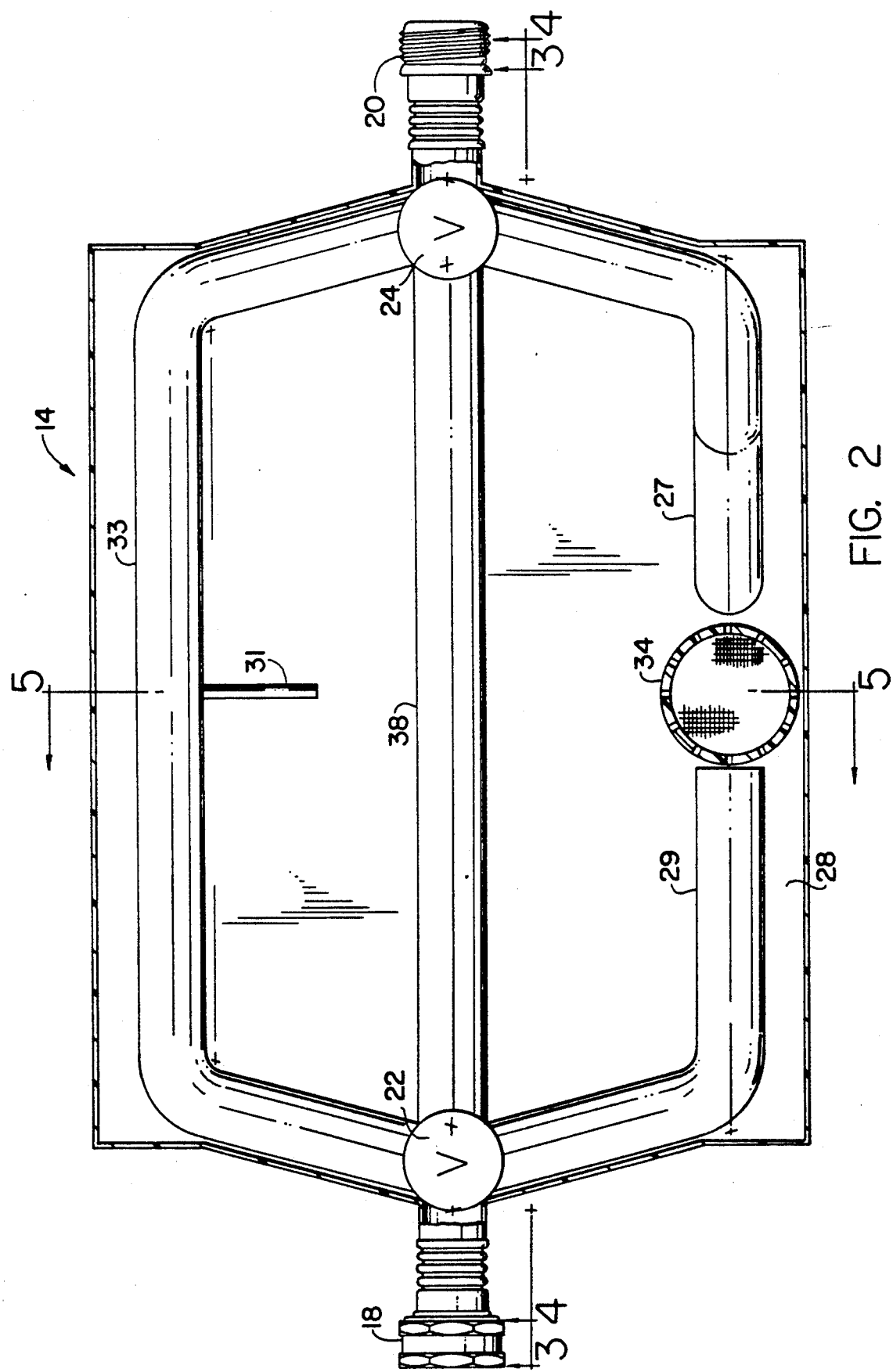
FIG. 2 is a top plan view of the dispenser.

Referring to FIG. 2, the dispenser 14 is adapted to be inserted between garden hose lengths 12 and 12a which could conceivably be connected to one another in a conventional lawn sprinkler system of the type familiar to any home owner. In accordance with the present invention, however, the garden hose 12 is instead secured to one end 18 of the dispenser 14 by means of a conventional coupling of the type normally provided on any sprinkler such as that indicated generally at 16 in FIG. 1. The outlet end 20 of the dispenser 14 is similarly secured to the garden hose 12a. A conventional coupling with the components reversed is provided to assure liquid tight connection for the dispenser 14 between the garden hose 12 and the garden hose 12a. It will be apparent that the dispenser 14 could also be connected directly to the sprinkler 16 in the event that the hose section 12a would be unavailable, as in the case of a relatively small size lawn, or perhaps unneeded in the case that the dispenser 14 might be used close to the house or exterior rear faucet connection 10.

With reference to FIG. 2, a three way valve 22 is provided in the inlet end portion of the housing. The housing defines several passageways that communicate with the three selectively openable ports of the three way valve in order to provide at least three different paths for the flow of water through the device 14 as the water passes from one garden hose 12 to the other 12a.

Figure 5:
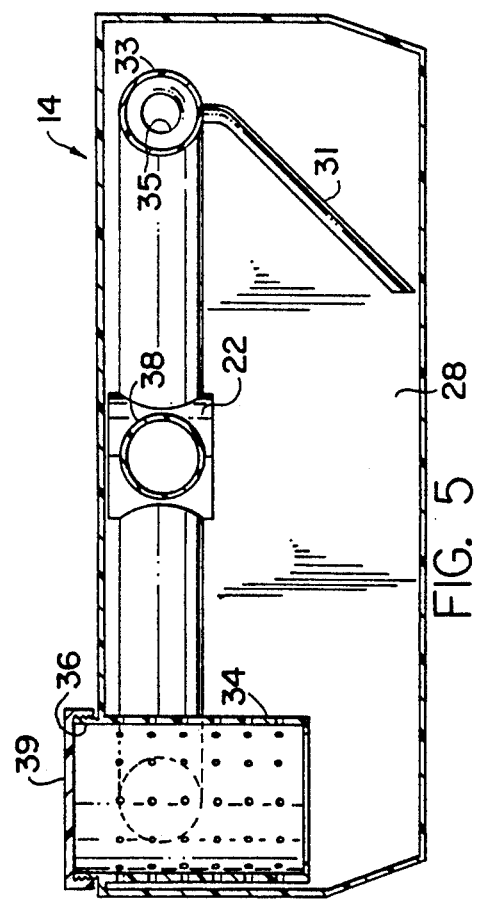
FIG. 5 is a sectional view taken generally on the line 5—5 of FIG. 2.

A first passageway 29 communicates with the chamber 28 defined by the hollow housing as best shown in FIGS. 2 and 5. The chamber 28 can be seen to have provided therein a container 34 which has perforated walls, and which is provided directly below an access port 36 to permit filling the perforated receptacle 34 with solid pellets or powder that are to be dissolved for purposes of providing a desired concentration of chemicals to the homeowner's lawn. A closure cap 39 is provided on the access port 36 and is suitably vented so that water entering the chamber 28 through passageway 29 will dissolve the pellets or powder in the receptacle 34 and ultimately pass through a further passageway 27 and valve 24 to be dispensed by the sprinkler. A second passageway communicates with a conduit 33 best shown in FIG. 4 for dispensing a liquid chemical. The same port 36 can be used to provide chemicals to the chamber 28. A venturi 35 in conduit 33 creates a suction in siphon tube 31. Thus, with both valves 22 and 24 properly positioned conduit 33 provides for liquid chemicals in chamber 28 to be drawn up in siphon tube 31 into the water stream for dispensing by the sprinkler 16.

As best shown in FIG. 5 when the device is to be used in a passive state (that is to simply provide water to the lawn rather than to apply chemicals) a through conduit 38 can be used for this purpose. Both valves 22 and 24 are appropriately positioned for this purpose.

I claim:

1. A lawn chemical dispenser for use with a garden hose and sprinkler, said dispenser comprising:
   a) a housing having hose fittings at one and an opposite end portion thereof, said fittings being adapted to receive conventional garden hose fittings, said housing defining a single chamber,
   b) a three way valve provided in the one end portion of said housing and having at least three positions,
   c) said housing defining at least three passageways, each passageway corresponding with one of said at least three valve positions,
   d) two of said at least three passageways communicating with said chamber, a suction tube provide in one of said two passageways for communication between said one of said two passageways and said chamber and a container for dry chemicals interposed in the path of the other of said two passageways, e) said chamber having an access port for receiving the chemical to be applied to the lawn, f) of said at least three passageways a third passageway extending in uninterrupted fashion from said valve to said opposite end portion of said housing.

2. The dispenser of claim 1 further characterized by a two way valve provided in said opposite end portion of said housing.

3. The dispenser of claim 1 wherein said housing passageways and chamber are defined by a molded thermoplastic material.

4. The dispenser of claim 3 further characterized by another three way valve provided in said opposite end portion of said housing and having at least three positions, each position corresponding to one of said at least three passageways.

5. The dispenser of claim 4 wherein said access port has a removable closure secured thereto.

6. The dispenser of claim 5 wherein a vent opening is provided in said closure.

* * * * *